US007743070B1

(12) United States Patent
Blumberg

(10) Patent No.: US 7,743,070 B1
(45) Date of Patent: *Jun. 22, 2010

(54) ENTERTAINMENT MANAGEMENT INTERACTIVE SYSTEM USING A COMPUTER NETWORK

(76) Inventor: J. Seth Blumberg, 2170 Century Park East, #1911, Los Angeles, CA (US) 90067

( * ) Notice: Subject to any disclaimer, the term of this patent is extended or adjusted under 35 U.S.C. 154(b) by 2892 days.

This patent is subject to a terminal disclaimer.

(21) Appl. No.: 09/694,276

(22) Filed: Oct. 24, 2000

Related U.S. Application Data

(63) Continuation-in-part of application No. 09/467,760, filed on Dec. 20, 1999, now Pat. No. 6,240,415.

(60) Provisional application No. 60/158,164, filed on Oct. 7, 1999.

(51) Int. Cl.
*G06F 17/30* (2006.01)
(52) U.S. Cl. .................... 707/783; 709/203; 705/39
(58) Field of Classification Search ............... 707/1, 707/100, 10, 9; 705/17, 39; 709/203
See application file for complete search history.

(56) References Cited

U.S. PATENT DOCUMENTS

| | | | |
|---|---|---|---|
| 4,592,546 A | 6/1986 | Fascenda et al. | 273/1 |
| 4,712,174 A | 12/1987 | Minkler, II | 364/200 |
| 4,799,156 A | 1/1989 | Shavit et al. | 364/401 |
| 5,243,517 A | 9/1993 | Schmidt et al. | 364/419.2 |
| 5,263,723 A | 11/1993 | Pearson | 463/41 |
| 5,311,424 A | 5/1994 | Mukherjee et al. | 364/401 |
| 5,446,842 A | 8/1995 | Schaffer et al. | 395/200.01 |

(Continued)

FOREIGN PATENT DOCUMENTS

CA 2069415 4/1992

(Continued)

OTHER PUBLICATIONS

ESPN.com, "Jose Valentin profile, statistics and more", http://web.archive.org/web/19990508133644/espn.go.com/mlb/profiles/stats/batting/4948/.html, May 8, 1999.*

(Continued)

*Primary Examiner*—Cheryl Lewis
(74) *Attorney, Agent, or Firm*—Greenberg Traurig LLP

(57) ABSTRACT

A system, method, and apparatus is provided for computerized management of a method of corporate, business or sports management by a remote party comprising relating a current database of an entity. For instance, in sports management substantially real time management is possible. Data of a player together with a historical database related to that player and decisions can be transmitted. This is communicated between a central database processing resource and at least one remote party. A remote party is permitted to access the database and access designated data from the database, and input and output data. Voting and other management of the player, team, or business is possible in substantially real time or near real time by the remote party. A remote user can vote on financial compensation for a player, a coach or a team and/or for a bonus for a player, team or game. Similarly hiring and firing decisions can be made. Shareholders, fans or customers of an entertainment business such as sports can be more interactively involved in all aspects of management and ownership duties and thus be more thoroughly entertained.

75 Claims, 8 Drawing Sheets

U.S. PATENT DOCUMENTS

| | | | |
|---|---|---|---|
| 5,465,384 A | 11/1995 | Bejan et al. | 455/2 |
| 5,495,412 A | 2/1996 | Thiessen | 364/401 |
| 5,508,731 A | 4/1996 | Kohorn | 348/1 |
| 5,596,705 A | 1/1997 | Reimer et al. | 395/326 |
| 5,615,269 A | 3/1997 | Micali | |
| 5,682,196 A | 10/1997 | Freeman | 348/12 |
| 5,683,090 A | 11/1997 | Zeile | 273/269 |
| 5,692,212 A | 11/1997 | Roach | 395/806 |
| 5,713,793 A | 2/1998 | Holte | 463/25 |
| 5,742,776 A | 4/1998 | Toda | 395/201 |
| 5,758,257 A | 5/1998 | Herz | 725/116 |
| 5,774,866 A | 6/1998 | Horwitz | 705/7 |
| 5,779,549 A | 7/1998 | Walker et al. | 463/42 |
| 5,795,228 A * | 8/1998 | Trumbull et al. | 463/42 |
| 5,823,879 A | 10/1998 | Goldberg | 463/42 |
| 5,846,132 A * | 12/1998 | Junkin | 463/42 |
| 5,860,862 A | 1/1999 | Junkin | 463/40 |
| 5,864,871 A * | 1/1999 | Kitain et al. | 707/104.1 |
| 5,893,091 A | 4/1999 | Hunt | 707/3 |
| 5,915,256 A | 6/1999 | Rogers et al. | 707/501 |
| 5,921,865 A | 7/1999 | Scagnelli | 451/539 |
| 5,924,082 A | 7/1999 | Silverman et al. | 705/37 |
| 5,949,411 A | 9/1999 | Doerr et al. | 345/327 |
| 5,950,172 A | 9/1999 | Klingman | 705/26 |
| 5,950,176 A | 9/1999 | Keiser et al. | 705/36 R |
| 5,987,435 A | 11/1999 | Weiss | 705/36 R |
| 6,029,171 A | 2/2000 | Smiga et al. | 707/102 |
| 6,035,288 A | 3/2000 | Solomon | 705/37 |
| 6,042,492 A * | 3/2000 | Baum | 473/453 |
| 6,052,717 A | 4/2000 | Reynolds et al. | 709/218 |
| 6,065,042 A | 5/2000 | Reimer et al. | 709/203 |
| 6,067,531 A | 5/2000 | Hoyt et al. | 705/35 |
| 6,081,810 A * | 6/2000 | Rosenzweig et al. | 707/104.1 |
| 6,085,191 A * | 7/2000 | Fisher et al. | 707/9 |
| 6,088,702 A | 7/2000 | Plantz et al. | 707/103 |
| 6,104,815 A | 8/2000 | Alcorn et al. | 380/251 |
| 6,138,155 A | 10/2000 | Davis et al. | 709/224 |
| 6,141,653 A | 10/2000 | Conklin et al. | 705/80 |
| 6,164,971 A | 12/2000 | Figart | 434/154 |
| 6,192,215 B1 | 2/2001 | Wang | 434/307 |
| 6,195,646 B1 | 2/2001 | Grosh et al. | 705/26 |
| 6,204,862 B1 | 3/2001 | Barstow et al. | 345/473 |
| 6,224,486 B1 * | 5/2001 | Walker et al. | 463/42 |
| 6,240,415 B1 * | 5/2001 | Blumberg | 707/9 |
| 6,260,024 B1 | 7/2001 | Shkedy | 705/37 |
| 6,263,501 B1 | 7/2001 | Schein et al. | 463/19 |
| 6,280,325 B1 * | 8/2001 | Fisk | 463/19 |
| 6,332,135 B1 | 12/2001 | Conklin et al. | 705/80 |
| 6,338,050 B1 | 1/2002 | Conklin et al. | 705/80 |
| 6,418,415 B1 | 7/2002 | Walker et al. | 705/26 |
| 6,466,919 B1 | 10/2002 | Walker et al. | 705/37 |
| 6,615,182 B1 * | 9/2003 | Powers et al. | 705/7 |
| 6,631,522 B1 * | 10/2003 | Erdelyi | 725/53 |
| 2003/0041013 A1 | 2/2003 | Grey et al. | 705/37 |

FOREIGN PATENT DOCUMENTS

EP 0502178 B1 9/1992

OTHER PUBLICATIONS

Fimea, Mike; "Fans Exercise Their Options at Web Site"; Arizona-Business Gazette, Sep. 11, 1997.
US 6,047,266, 04/2000, Van Horn et al. (withdrawn)

* cited by examiner

ENTERTAINMENT MANAGEMENT INTERACTIVE SYSTEM USING A COMPUTER NETWORK

RELATED APPLICATIONS

The present invention relates to Provisional Application Ser. No. 60/158,164, filed Oct. 7, 1999, and entitled "CORPORATE AND ENTERTAINMENT MANAGEMENT INTERACTIVE SYSTEM USING A COMPUTER NETWORK"; Continuation-in-Part application Ser. No. 09/467,760, U.S. Pat. No. 6,240,415, filed Dec. 20, 1999, and entitled "CORPORATE AND ENTERTAINMENT MANAGEMENT INTERACTIVE SYSTEM USING A COMPUTER NETWORK", the contents of which are incorporated by reference herein.

BACKGROUND OF THE INVENTION

This invention relates to a management system. In particular, the invention is concerned with a system, apparatus and method for managing businesses, participants, directors and actions of a remote entity using a computer network. More particularly, the invention is directed to improving accountability in managing and operating enterprises.

Currently in the entertainment business of professional sports there are significant problems: players salaries in the big leagues have skyrocketed to the point where many teams have a hard time breaking even each year; cities that are considered small markets have a difficult time competing financially for good enough players to have a reasonable chance of making the playoffs in the big leagues; owners have no effective way to deter their players from behaving unprofessionally or even breaking the law routinely; and teams do not have sufficient loyalty to their city where they currently reside to cause them to plan on staying.

On Sep. 28, 1999, Canada's four Major League hockey teams announced that if they did not receive governmental assistance in one way or another, like many teams in the United States have with publicly financed for such things as stadiums, that they would have to sell their teams to the United States.

Star players contracts are written heavily in the players' favor and the stars are treated with immunity from the normal societal rules and the law that some players no longer find it important to follow the coaches directions or to act minimally professional. Many star players have little fear of hurting their livelihood if they publicly break the law by using drugs, abetting prostitution, and even physically striking or choking their head coach as occurred in the National Basketball Association. The young fans, children, rarely watch their favorite athletes behaving as decent role models, contributors to society, and upstanding law abiding citizens. Many of the teams and leagues do not enforce their own rules on morals clauses—players fail drug tests repeatedly with little significant deterrence. Star players often do not show up to work for practice as required by their high paying contract. Fans are often disgruntled about the lack of professionalism.

Much of this is caused by the players being unaccountable to the fans. In the past there has been no way for the fan to reward or punish the player, team or league directly other than to not watch a game. Currently, if a major league team with no leverage over its players does not punish its players for committing crimes or for not showing up to work on time their individual fans have no way to affect any real leverage of their own. Currently, National Football League teams owners and their management offices are so powerless with their players that they are hoping that the league's central organizing office under the NFL commissioner will fine the players to deter continued taunting with gestures of extreme violence, such as making a throat cutting gesture towards opposing players and opposing fans after a big play, as was reported in many newspapers on Nov. 23, 1999.

Similarly, team owners do not feel the leverage of individual fans in their big decisions. Cities are driven to making unwise financial decisions that give financial incentives to teams to dump their old city and move to theirs. Cities are often so desperate to get a team in their area that some teams sneak out in the middle of the night and leave for a different city. The city that was unceremoniously dumped may be stuck with the bill for a new stadium that it financed with the hope of encouraging the team not to leave their city. Many owners simply cannot afford the high salaries needed to compete successfully in some leagues, and the owners often do not have any hope of having leverage with a player over the life of the player's contract to induce the player to perform in a professional manner.

This invention is directed to a solution to allow the fan's input help solve the current problems with professional sports and thereby change the imbalance in leverage in the negotiations between the player and the team and between the city and the team.

With the use of this invention, players could make the same amounts of money, but it would be less likely that they would be able to just sign big guaranteed contracts with big signing bonuses and then never have to perform.

The invention seeks to overcome difficulties in the management and performance of entities which have previously operated without the normal controls and checks and balances that are required for the professional organization of a business with accountability.

The invention seeks to bring a greater degree of control and responsiveness between customers of an organization and the organization and members of the organization, by the members' employees, directors, shareholders or other supporters.

The invention is directed to the employment of a computer network for facilitating increased responsibility between two entities, essentially customers or consumers on the one hand, and the corporate or business entity on the other hand.

SUMMARY

This invention involves the use of an apparatus, the interne, along with data files interacting according to the method and system of this invention.

A software program and a logic architecture enables people from any location in the world with access to the Internet or other computer communication network to receive and transmit information from a database on which to determine their decisions in relation to a company such as a sports entertainment company that owns a professional sports team. The decisions that can be made by the remote consumer/ sports fan or shareholder include, among others: decisions on the compensatory bonuses, salaries and other awards to professional athletes/coaches/executives in direct response to their actual performance, or lack thereof, during an ongoing event and available for the participating members to decide by vote in real time or near real time; decisions to purchase or sell shares of a publicly traded company which owns, for example, a sports team where the shareholder or, in appropriate situations, the fan has an ability through the use of the invention to actively participate by voting in management decisions, board of director decisions and owner decisions; decisions on the points awarded to the contestants for each round of boxing match and taking into account the effectiveness of a punch as measured by a boxing glove sensor among others that allows the remote voter to consider data regarding the measure of the impact, or lack thereof, for each of the boxers' most significant punches.

Additionally, in relation to management, ownership and control and play of an entity, for instance in sports management, the system permits fan and/or shareholder interaction in relation to management, personnel, player or employee hiring and firing decisions. Additionally, there is the ability to have input on the compensation of players, coaches or management, a bonus for a specific play or for a specific quarter's performance or total salary. Moreover, in a sports entertainment company, a fan can have input on the key players' roles such as whether or not to be on the first team; and, more specifically, individual play calling with real time remote input from shareholders or fans. This can be effected in substantially real time or near real time, namely a participant can receive information by a communication link, for instance, watching a sports event on TV, and then respond by inputting information, a decision or data through a computer communication network. This allows the remote participant, fan, member or shareholder to interact with the players, actors, coaches, directors, and others to such a degree, so instantaneously during a live event that they actually cause drastic changes in the ongoing performance. Thus the participant is intimately involved to the point of potentially becoming engrossed in their own important role in the performance.

Additionally, fans seeking entertainment, or shareholders looking to take a more active role in the decision making of their team, at any time of day or night can participate as a voter over the Internet in shareholder decisions, management decisions and coaching decisions made available to them through a database. This database is managed by the Internet Participant Interaction Entertainment (IPIE) described here and as approved by the shareholders through a shareholder vote also using the IPIE.

Specifically, a fan is able to watch a professional sports game either on television or possibly on the IPIE. The fan or participant is able to vote through the use of the IPIE at the end of each play or each quarter on the internet on how to compensate the players, coaches, or management and staff for their performance in that period.

The funds for compensation may be raised by advertising proceeds from the IPIE sale of advertising space, proceeds raised from fans' tickets for the right to participate in the IPIE, proceeds raised from the IPIE or proceeds raised from the team's shareholders allocated monies from reserves to be used in conjunction with the IPIE to compensate players either with or without an additional base salary separately paid.

Additionally, according to rules established by the shareholders, some coaching decisions can be made just before and during a game by the fans or alternatively by the shareholders by vote over the Internet using the IPIE. The fans could also suggest ideas for changes.

This creates a new and unique entertainment capability for the fan. When the board of directors of the team votes in favor of allowing the fans who are pre-qualified to participate under controlled circumstances or the board of directors of a team reaches the point of indifference as to which way a decision should go, then the fan can partake in voting on the outcome of a management and coaching decision—including such decisions as compensation and who should be the starting players. The so authorized decision-making voters (whether just the shareholders, pre-qualified fans or all fans depending on the Board of Directors decision) would have access to all the data that the coach or general manager would advise is pertinent in making that particular decision.

The invention is particularly concerned with sports management or entertainment business management by a remote party. Data between a central database processing resource and at least one remote party is communicated after receiving an access request message from the remote party via a communications link. An access enabling message is transmitted to the remote party via the communications link wherein the remote party is authorized to access the database. The access enabling message permits the remote party to access the database and access designated data from the database.

The data in the database includes historical data relating to the player related with the current data related to that player being accessed. A report is compiled from the accessed database, the report including the current data of a player together with the historical data related to that player such as a comparative analysis with other players; and transmitting the compiled report of the data of the player to the remote party.

Periodically the database is updated with at least one of the historical or current data about the player. Further, there is included the analysis of the data of the player, and the reporting to the remote party. The report is stored in the central database processing resource.

Access to the central database processing resource is controlled wherein data in the database is accessible to selected multiple remote parties, in encrypted form if necessary.

Historical data of players is combined with current data of players thereby to permit an analysis predicting play scenarios and probabilities of selected players.

Communicating between a remote party and the central database processing resource through a computer network includes providing credit card information of the remote user prior to providing the data, and data is transferred to the remote user after charging a credit card for such data. Monies can be transferred electronically via a telecommunications line between respective financial entities related to the remote party and to an operator of the central database. These monies would be payments or subscription fees for participation in the event, corporation, sport team and for payment directly or indirectly of bonuses or other compensation.

Management, particularly of sports by a remote party comprises viewing, using a computer, both current data for a player, and historical data about the player. Analysis, using a computer, of the historical data and the current data related to the player based on predetermined characteristics is effected. The data and analysis relates to a combination of the historical data of players, and data being to permit an analysis predicting probabilities and play of selected players.

The invention is also directed to corporate management by a remote participant comprising of relating to a current database of a corporate situation through data communication between a central database processing resource and at least one remote participant. The remote participant accesses the database and accesses designated data from the database. The data in the database includes selected data relating to the employee with the current data related to the corporate situation. A report is compiled from the accessed database, the report including the data of the situation. This is then transmitted to the remote participant.

The remote party can receive at least one expert opinion. The remote participant transmits a response or vote through the IPIE to the question then being decided, or the remote participant can vote in relation to the expert opinion(s) depending on the specific authorization previously approved by vote of the Board of Directors or the shareholders also through the use of the IPIE. A controller of the central database receives at least one expert opinion on an issue. The expert opinion is selectively made available to at least one remote user, such that the remote user can selectively make decisions based on the opinion, and selectively transmit the decision to the central database.

In another aspect of the invention there is a hierarchy of remote users. There are, different levels in the hierarchy having a different weight for their respective votes, opinions or decisions. The Board of Directors or the shareholders can approve the factors involved in ascertaining the different weights of different voters opinions based on such thing as: the number of years one has lived in the community of that sports team, the number of years a fan has had season tickets, the fact that a vote may be placed by a fan through the IPIE while the fan is actually at the ongoing athletic contest, the fact that a particular fan has bought shares of the team, and other relevant factors. The votes or decisions can be transmitted to the central database and the outcome of the vote with weighted analysis is accomplished through the IPIE.

Some of the remote users in the hierarchy are non-shareholders in relationship to ownership of the database which is used, for example, for managing a corporation which can be a sports entity or other entertainment business entity, for example a producer of live theatre. Others of the hierarchy are shareholders, and others are board members for the entity owning the database. In a corporate situation, selectively the ownership of one or more sports team(s), the staff, for instance accountants, board of director levels, executive level, customer level, can be subjected to different authorities of power in the corporation. In a real time sense decisions can be portrayed in a video communication scenario, and the opinions can be transmitted appropriately through the computer network, such as the Internet. Customers or fans who are disgruntled could vote in mandatory punishments for players who are found guilty of commit crimes or who violate other minimum behavioral requirements such as showing up to work on time. Fans could review the data on the players' vote as to who should be the head coach in making that hiring decision.

As such, a remote participant is enabled in real time or near real time to interact with a core or central business, player, actor or event of an enterprise as that business, player, actor or event is taking action. The remote participant obtains the information ideally from a video or TV connection or interface, and responds through a computer network, including the Internet to the enterprise, player, action or event.

Another aspect of the invention involves remote participants interacting in real time or near real time with a significant and important effect or function with a live theatre or other entertainment or movie production company during the ongoing processes of that entertainment production. The participants could respond to ongoing live choices of different actors trying out for different roles in the show or movie by watching in a remote location via a transmission to the participants television monitor or the computer screen itself. The television signal could be sent on a network such as the internet or on cable or other method. The participants or shareholders would be able to perform the owner, manager, producer or director functions by remotely voting through the IPIE as to the specific selection, decision or choice of the following in a live ongoing participant fashion: reading by an actor or actress, choosing between different scripts as viewed and read on the internet through the IPIE, editing of the script during the transformation from a treatment or mere story line or idea to a full blown script, angle and closeness or lens for the camera shot, which take of a scene is best, choosing between different endings of the script, total budget for the production, amounts to budget for each line item, amounts to spend in advertising, what markets to focus on for release, what day to release the film in different markets, and participate in technical ongoing live or near live expert debates on all the above subjects potentially with paid famous expert opinions if the shareholders so approve by vote through the IPIE. Similar to the sports embodiment described herein, different weight could potentially be applied to different participants votes depending on such factors as expertise in the area defined by certain shareholder defined criteria, number of shares in the company, amount of time or money spent interacting with that production through the IPIE. Bonuses for excellent performances could be allocated by the remote participants based on a pool of money allotted by the shareholders for that purpose.

The invention is further described with reference to the accompanying drawings.

DETAILED DESCRIPTION OF THE PREFERRED EMBODIMENT

The present invention will now be described in detail with reference to a few preferred embodiments thereof, as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Overall System

Figure 1:
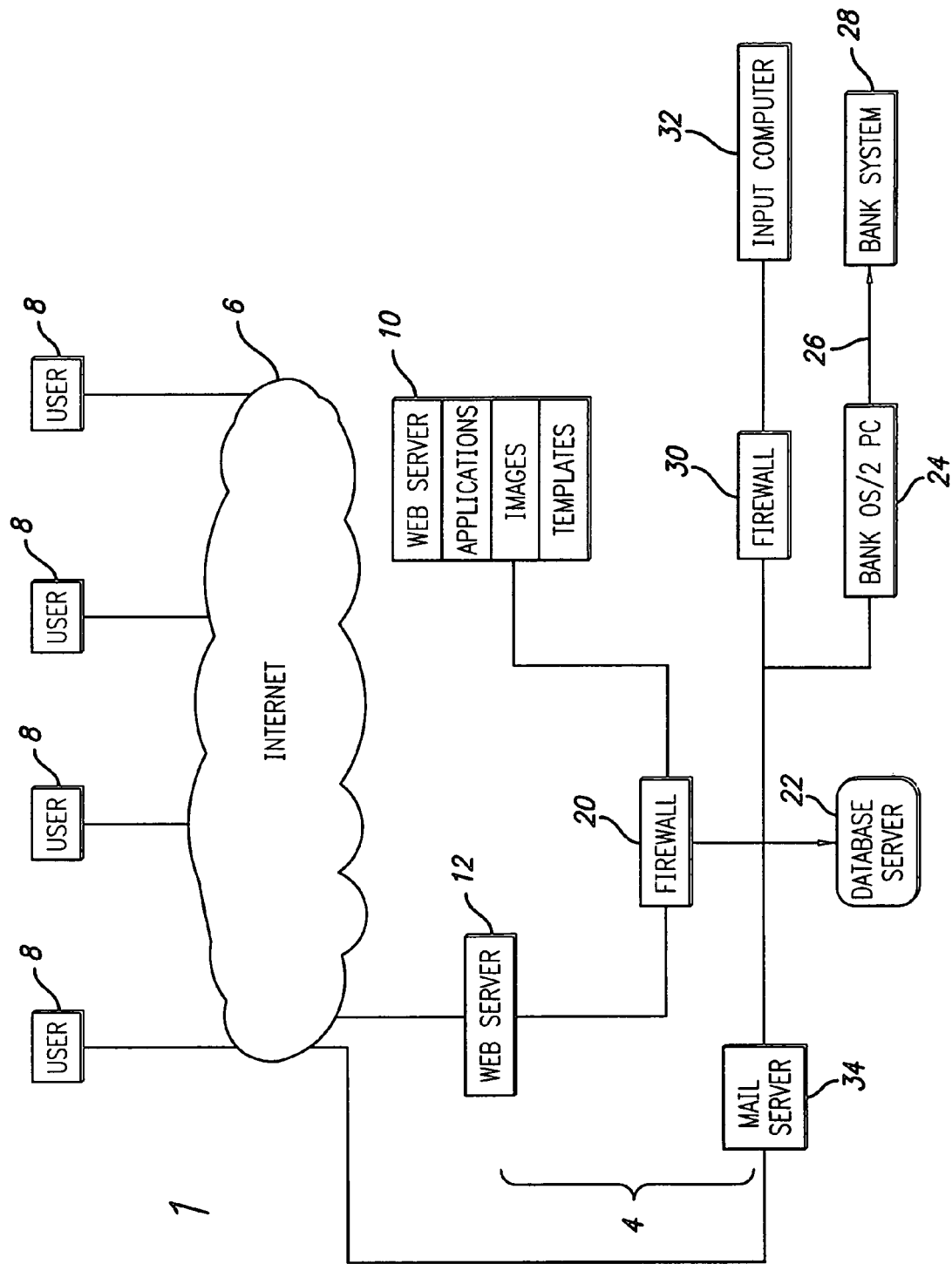
FIG. 1 is an overall view of a web-based system to provide access to a database management system of a business database in relation to the Internet.

FIG. 1 is an overview of the web-based system to provide access to the invented database management system. With this system multiple users, for instance, remote users 8, access the web site 4 using the Internet 6. Each of the users 8 has a computer terminal with the appropriate software for accessing Internet. The users 8 may be unknown to the web server computers 10 and 12. Each user 8 is allowed to browse the web site and explore how the system functions.

There are several aspects to maintain security of information maintained in the database server 22 and a banking system 28. A firewall 20 prevents any user 8 from accessing any of the components behind the firewall 20. In this way the users 8 have access to the web server computers 10 and 12, but only have access to the database server 22 through the firewall 20. The database server 22 maintains, among other things, various database fields with respect to each of the profiles of subject employees, shareholders, directors and other pertinent information of a subject and other related groups and/or competitors. The database 22 maintains the services with a designation associated to determine what data can be browsed by the users 8. Each of the web server computers 10 and 12 allow users 8 to view subject and group categories and actual services and data products which are available from the database.

The web server computers 10 and 12 can be identical and can be duplicated as additional load or growth on the system occurs. The web server computers 10 and 12 share the responsibility for servicing the users of the site. This arrangement provides for expandability of the system by merely adding additional web server computers as necessary.

When the system requires payments for access, data, products or services, the system preferably includes an appropriate computer terminal 24 for interfacing with independent financial institutions which are connected on-line via the serial connection 26 to the financial institution computers 28. This allows automatic real time confirmation of the access of data, services, and products.

Once a user requires access to a product or service, the user goes through an identification or registration process and the exchange of financial information to allow for credit or debit card payment of the access, data or purchase. This is verified, confirmed and authorized by the appropriate bank system institution 28. Confirmation of the access, purchase or deposit of data, or a service is made by a mail server 34 which sends an E-mail to the user 8 confirming the purchase or deposit. The mail server 34 allows for mail to be received and sent out. Security of the various databases is maintained. Alert messages are generated when an unauthorized access is attempted. Verification messages, authorization messages and confirmation messages are generated as appropriate.

The database server 22 is also designed to interact with an input computer 32 operated by a central database processing resource (CDPR). A firewall 30 serves to prevent unauthorized access to the database server 22 or to the input computer 32. The input computer 32 can input profile data and other data to the database, after appropriate access and/or passwords are entered into the system. Similarly, users 8 through their own computers can use appropriate access codes and passwords to input data to the database server 22. This is tightly controlled for security reasons. The data may only be added to an independent sub-database of the data server 22, and only after scrutiny by the CDPR operator of the database through input computer 32, will this data from users 8 be subsequently added to the main database server 22.

Figure 2:
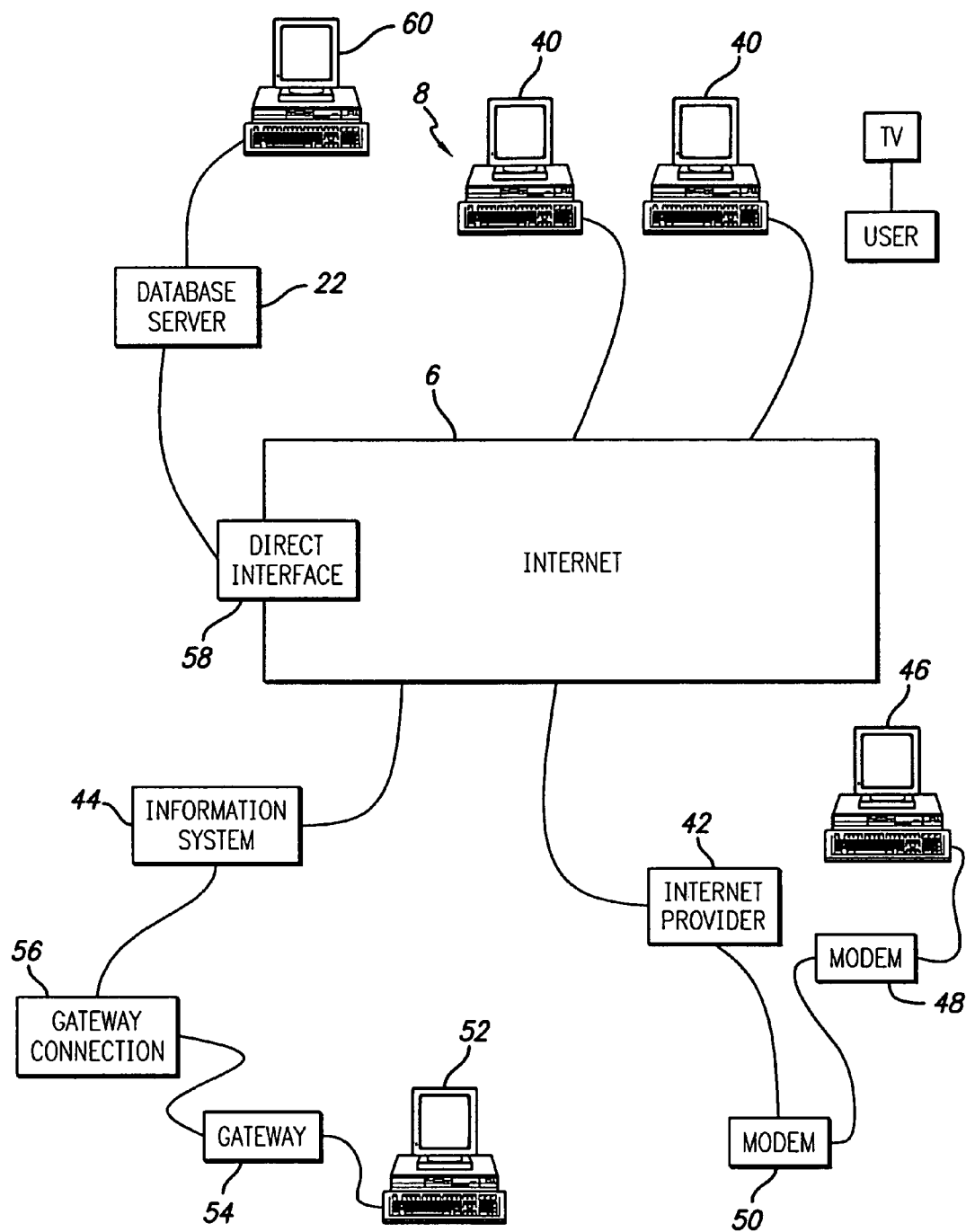
FIG. 2 is a graphical illustration of a computer network, namely the Internet.

FIG. 2 is an illustration of the Internet and its use in the system of the invention. The Internet 6 is a network of millions of interconnected computers 40 including systems owned by Internet providers 42 and information systems 44 such as America Online™. Individual or corporate users may establish connections to the Internet in several ways. A user on a home PC 46 may access data, purchase or access an account through the Internet provider 42. Using a modem 48, the PC user can dial up the Internet provider to connect to a high speed modem 50 which, in turn, provides a full service connection to the Internet. A user 52 may also make a somewhat limited connection to the Internet through a system 20 that provides an Internet gateway connection 54 and 56 to its customers. The database 22 is also connected into the Internet 6 through an appropriate modem or high speed or direct interface 58. The database 22 is operable and maintained by the CDPR operator computer 60. Users of the databases of the invention would access the Internet in an appropriately selected manner.

Also shown in FIG. 2 is the relationship of a user of the system. The user is shown watching on a TV a sports game, which can be communicated on the TV either by cable or antenna satellite. The user would interact with the computer terminal 40 through the Internet 6 and the IPIE. In turn, the IPIE would interact through a controller to give input to the game.

An additional situation shows the ICIP connected through the Internet 6, which would be a business operational model of the system.

Figure 3:
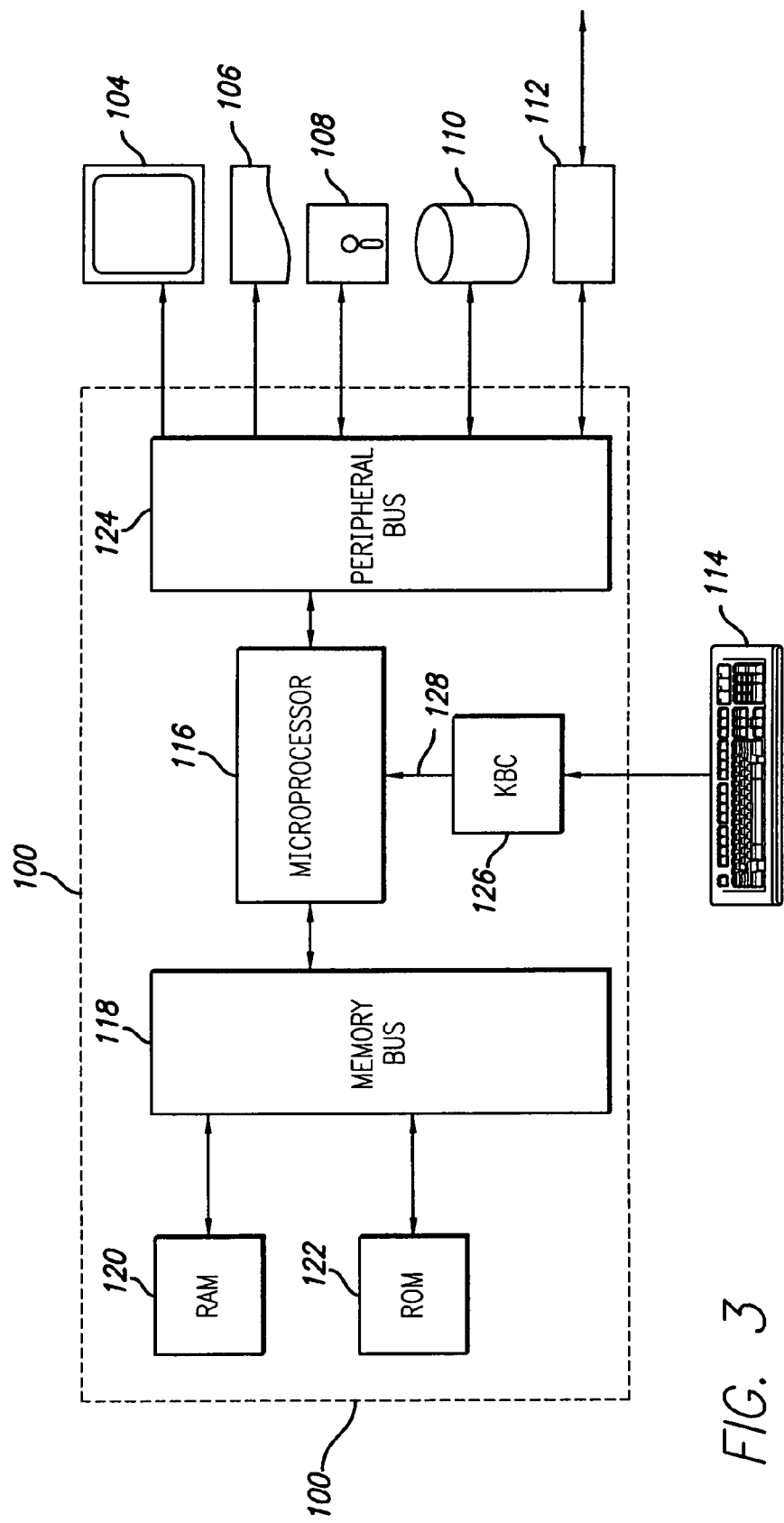
FIG. 3 is a block diagram of an exemplary computer system for practicing various aspects of the invention.

FIG. 3 is a block diagram of an exemplary computer system 100 for practicing various aspects of the invention. The computer system 100 includes a display screen or monitor 104, a printer 106, a disk drive 108, a hard disk drive 110, a network interface 112, and a keyboard 114. The computer system 100 includes a microprocessor 116, a memory bus 118, random access memory (RAM) 129, read only memory (ROM) 122, a peripheral bus 124, and a keyboard controller 126. The computer system 100 can be a personal computer, such as an Apple computer, e.g., an Apple Macintosh™, an IBM™ personal computer, or a compatible, a workstation computer, such as a Sun Microsystems™ or Hewlett-Packard™ workstation, or some other type of computer.

Microprocessor 116 is a general purpose digital processor which controls the operation of computer system 100. Microprocessor 116 can be a single-chip processor or can be implemented with multiple components. Using instructions retrieve from memory, the microprocessor 116 controls the reception and manipulation of input data and the output and display of data on output devices.

Memory bus 188 is used by the microprocessor 116 to access RAM 120 and ROM 122. RAM 129 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output, and storage devices used by computer system 10. These devices include the display screen 104, printer device 106, disk drive 108, hard disk drive 110, and network interface 112. The keyboard controller 126 is used to receive input from the keyboard 114 and send decoded symbols for each pressed key to microprocessor 116 over bus 128.

The display screen or monitor 104 is an output device that displays images of data provided by microprocessor 116 via peripheral bus 124 or provided by other components in computer system 100. The printer device 106 when operating as a printer provides an image on a sheet of paper or a similar surface. Other output devices such as a plotter, typesetter, etc. can be used in place of, or in addition to the printer device 106.

The disk drive 108 and hard disk drive 110 can be used to store various types of data. The disk drive 108 facilitates transporting such data to other computer systems, and hard disk drive 110 permits fast access to large amounts of stored data.

Microprocessor 116 together with an operating system operate to execute computer code and produce and use data. The computer code and data may reside on RAM 120, ROM 122, or hard disk drive 120. The computer code and data could also reside on a removable program medium and loaded or installed onto computer system 100 when needed. Removable program mediums include, for example, CD-ROM, PC-CARD, floppy disk and magnetic tape.

The network interface circuit 112 is used to send and receive data over a network connected to other computer systems. An interface card or similar device and appropriate software implemented by microprocessor 116 can be used to connect computer system 100 to an existing network and transfer data according to standard protocols. As such, the computer system is connectable through an interface device with the Internet 6.

Keyboard 114 is used by a user to input commands and other instructions to computer system 100. Other types of user input devices can also be used in conjunction with the present invention. For example, pointing devices such as a computer mouse, a track ball, a stylus, or a tablet can be used to manipulate a pointer on a screen of a general-purpose computer.

The present invention in relation to database management of data can also be embodied as computer readable code on a computer readable medium. The computer readable medium is any data storage device that can store data which can be thereafter read by a computer system. Examples of the computer readable medium include read-only memory, random-access memory, magnetic data storage devices such as diskettes, and optical data storage devices such as CD-ROMs. The computer readable medium can also be distributed over network coupled computer systems so that the computer readable code is stored and executed in a distributed fashion.

Specific System

Figure 4:
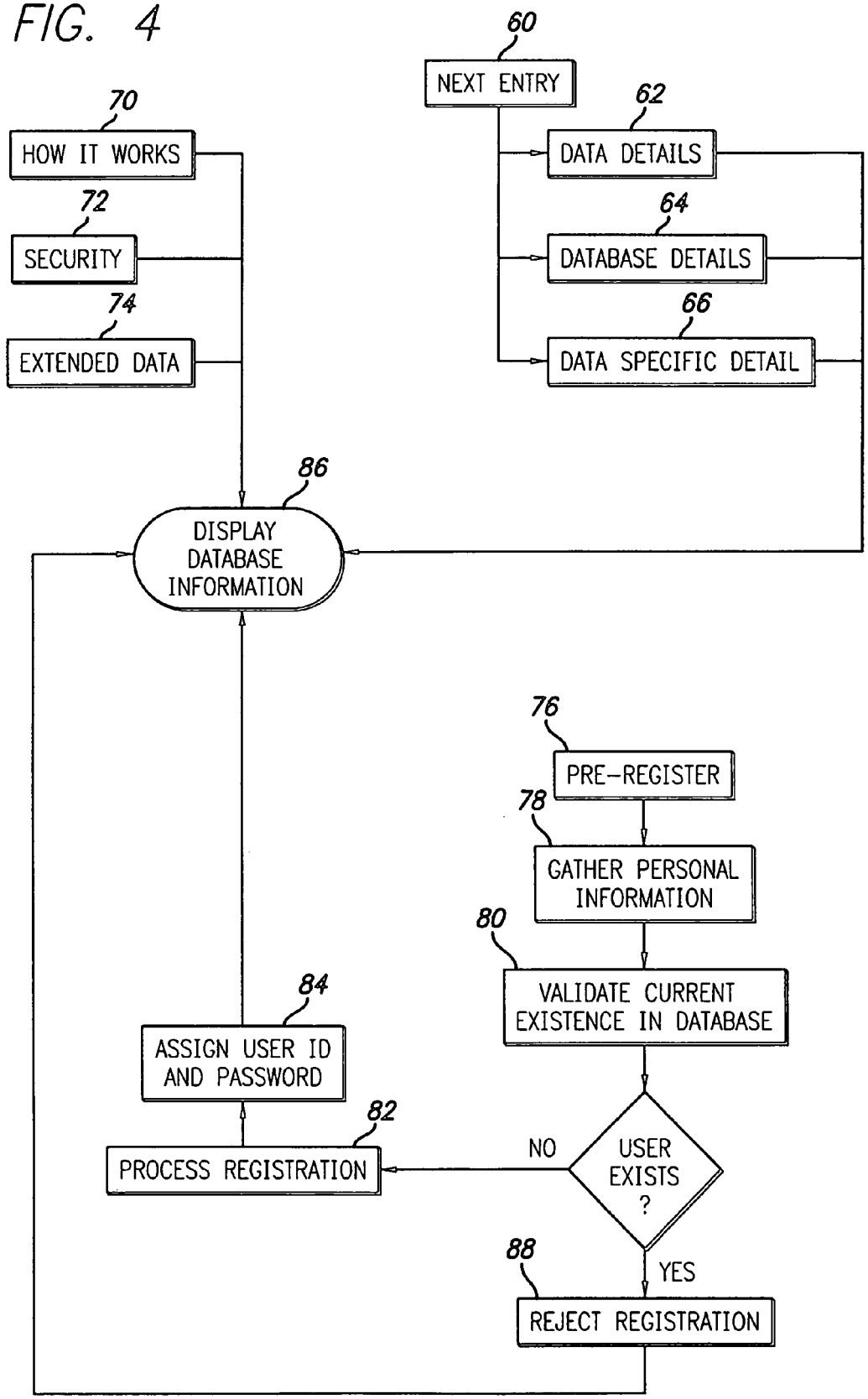
FIG. 4 is a view of a browser for the database management system for accessing the business database of the invention.
Figure 5A:
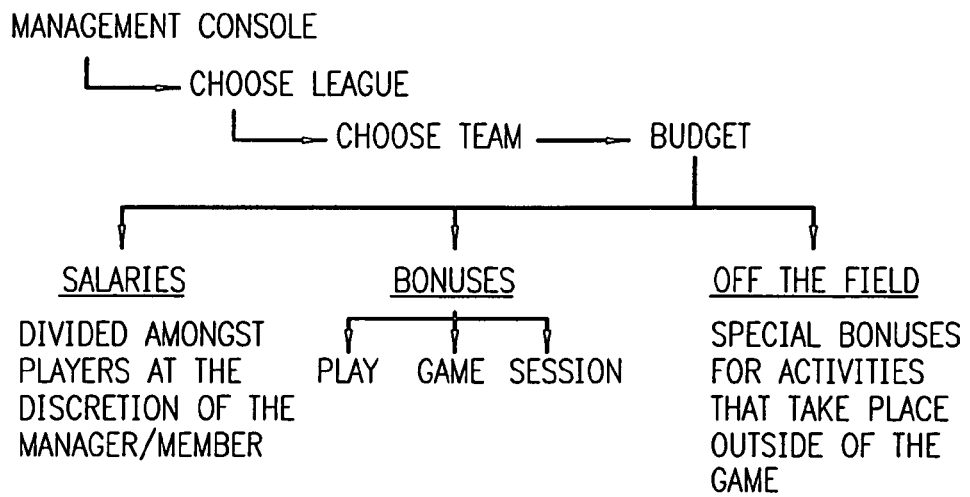
FIGS. 5a and 5b are representations of an IPIE which shows basic flow diagrams illustrating a CDPR with an exemplary process by which an operator of a CDPR receives and transmits data relating to business information, in particular a sports business.
Figure 5B:
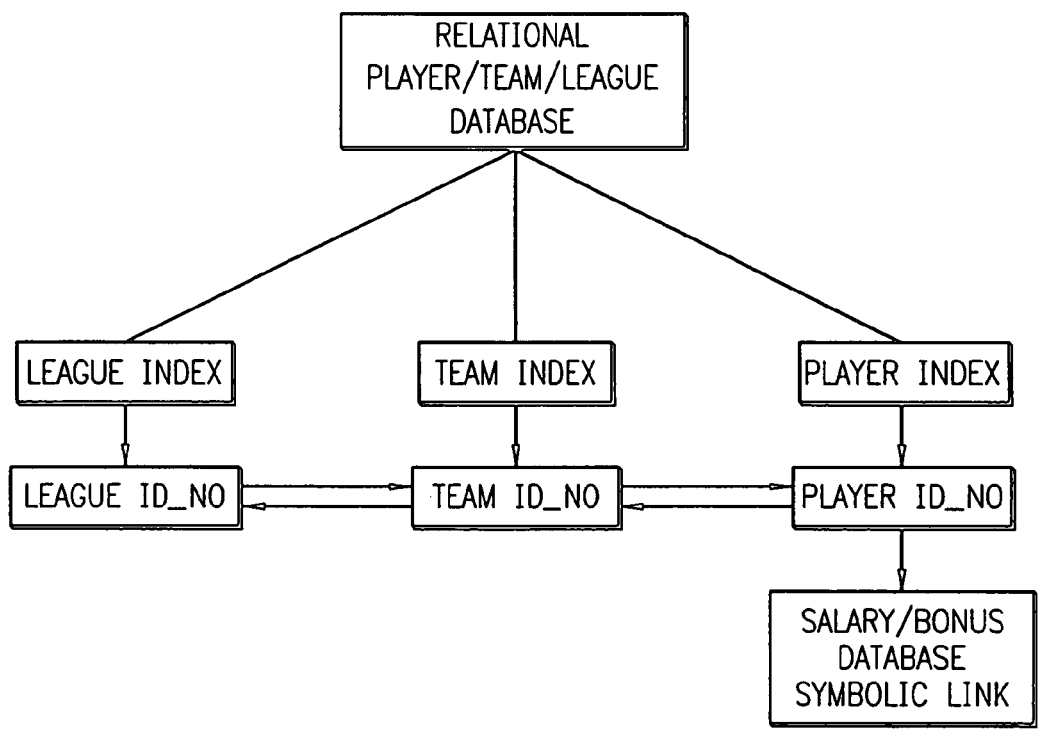
Figure 6A:
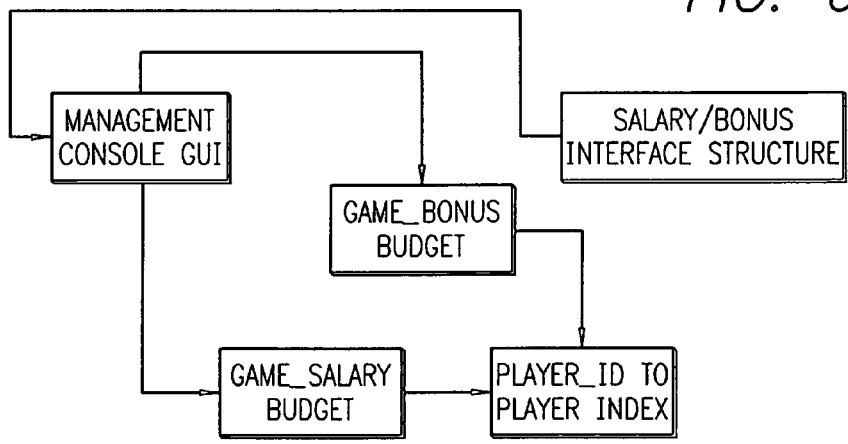
FIGS. 6a, 6b and 6c are representations of an IPIE which share a CDPR with detailed flow diagrams of the system steps employed in embodiments of the present invention wherein a remote user can relate to a decision heirarchy for a particular business, namely for a sports enterprise.
Figure 6B:
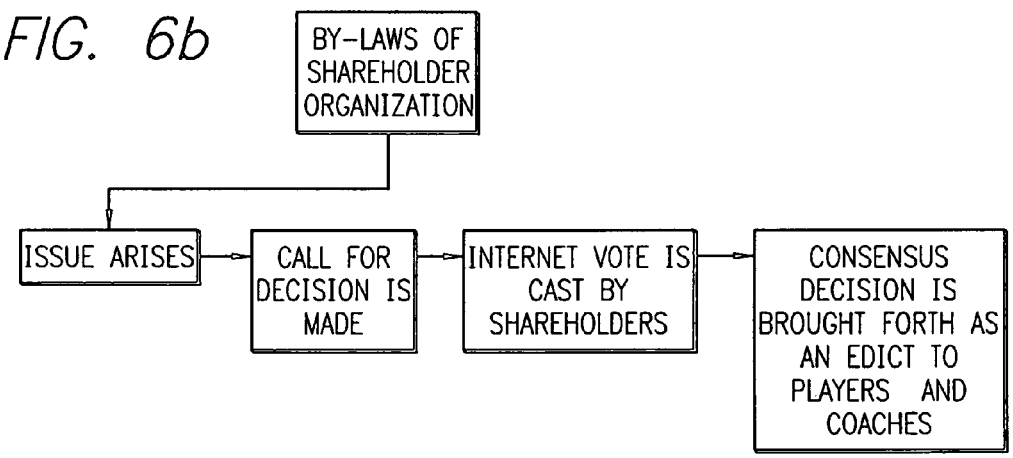
Figure 6C:
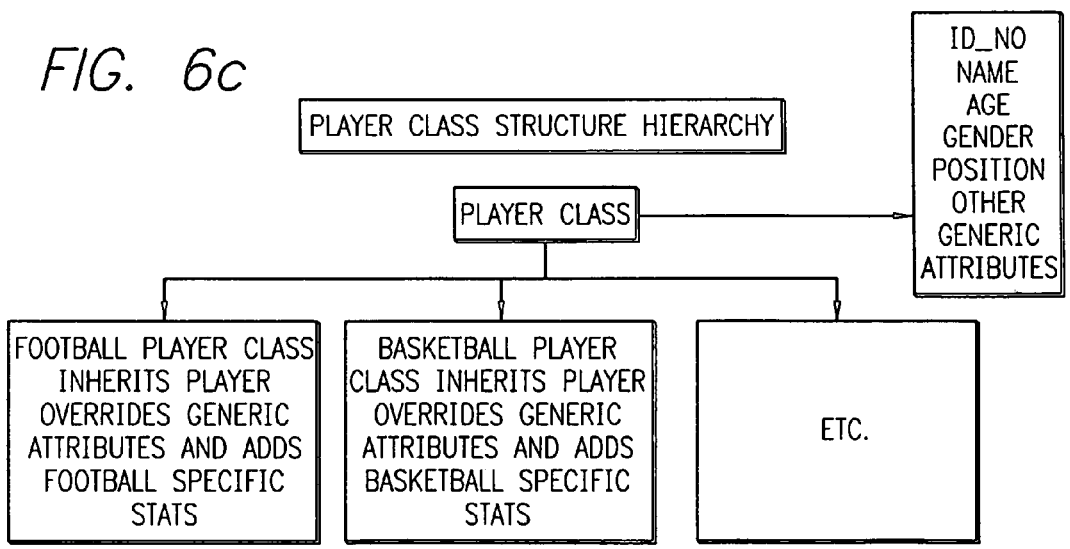

FIG. 4 illustrates a browser system for use with the database system of the invention. A browser goes through a number of preliminary screens and logic steps, and reaches a screen 60 entitled "Next Entry". This screen provides data details or information generally indicated as 62. Clicking on any of these categories allows the user to review database details 64, data specific details as generally indicated by 66. In this way, the user can index through a number of screens to get information regarding the different databases of the system. In addition, clicking on any of the triggers 70, 72, 74 and 76 is possible. These correspond to HOW IT WORKS, SECURITY, EXTENDED DATA and PRE-REGISTRATION. Clicking on trigger 70 provides the user with information on how the process works, explains the system, and provides details on how the user can participate in the database and obtain data or input data. Clicking on trigger 72 provides details regarding security of the system and automatic payment. In some cases, products and services are offered with extended data and clicking on trigger 74 which can provide details of the extended data and explains that this may only be available on certain services or products.

Trigger 76 allows a user to pre-register and obtain user ID number. This ID number is combined with financial information retained in the database in an encrypted form. The pre-registration trigger 76 follows with step 78 which is to gather personal information such as credit card number and expiry date to allow for automatic payment. Step 80 is to validate a current existence in the database, if this occurs. With a negative answer, the user is directed into a registration process indicate as 82. A user ID is assigned and a password is entered. This information is maintained in a portion of the database 22. At 84 the user is provided a screen identifying the user ID at screen 86. If the user already exists, the registration process is rejected at 88 and the user is advised of the information at the display 86. The screen at 86 would also represent the information which is available in the database 22.

Example Scenarios

1. Sports Management

The system of management of a sports entertainment business is illustrated in FIGS. 5a, 5b, 6a, 6b and 6c. The shareholders of a company that owns a professional football team can determine that the decision should be made available to consumers and/or fans. The decisions can, for instance, be about which of two quarterbacks should be on the starting team and play for a certain minimum amount of time in the next game, should the directors, coach or management consider this to be a close enough decision, then through the IPIE fans can be allowed for free, or alternatively for a price such as one dollar, to vote to determine the outcome. The fan or user can give input in real or nearly real time to the IPIE. The fan would, through the telecommunication system, for instance, TV, radio or computer screen, obtain data on the play or state of a game or players. By using an input to a computer network, for instance, through a keyboard, the user, namely a fan or other employee or participant can vote on further action to be taken in relation to the event, players, game or competition. Near real time can be between about 10 seconds to about 5 to 10 minutes.

The IPIE provides available player data and statistics for the fan as well as data relating to the opinions of the quarterback coaches, offense coaches, and other well known commentators, and opposing teams The commentators would be paid, by the company pursuant to a shareholder vote through the IPIE authorizing such expenditure. Their opinions can be available on the IPIE for assistance of each individual fan's determination of the vote of the fan through the IPIE. Alternately, the voters would have to choose between one of the board of directors approved expert opinions. The voters' votes can have different weights. Shareholders can vote to have some people's votes be weighed more than others. For example, the largest shareholder's vote and/or the head coach's vote may be given more weight than the fan who is not a season ticket holder. Fans who have been season ticket holders for five years or more may have their votes weighed most heavily. The exact apportionment of different weight for different votes can be fine-tuned by the shareholders through the IPIE and can be made available to the public through the IPIE.

The fan with the computer network, for instance the internet, access chooses to vote on the issues which are of interest or in which the vote counts heavily enough in the decision making process. Additionally, the IPIE can provide data relating to the statistical results of all the votes of the players on the team on some decisions and make that data available for the shareholder or fan to consider when the fan votes. Thus, the fans are empowered to make ongoing decisions by voting through the IPIE to make decisions as approved by the shareholders, such as choosing between the available personnel as to who should be placed on the starting team at the quarterback position in the next upcoming game.

Alternatively, the shareholders allow the coaches to decide among certain types of decisions which decisions are close enough to allow all fans to vote and make the individual decision. The logic architecture of the IPIE would adjust the program to enable that result.

Another alternative is that the coaches decide at certain times that a decision is to be made during the game by the fans or by the shareholders. The logic software architecture of the IPIE adjusts the program to enable that result. At certain points in the game the shareholders can actually be allowed to make play calls through use of secret voting on the IPIE. The result is communicated secretly by the IPIE to the quarterback in the huddle on the field just before the play.

After the each football play, for example, the statistics on the percentage of votes for different plays from the playbook can be made available for viewing by the fans through the use of the IPIE. This is a significant addition to entertainment value to the shareholder and is possible by use of the IPIE in conjunction with the system, method and apparatus of the invention employing the computer network, namely the internet. The IPIE provides an entertainment facility with a surprising result that the fans become more intimately involved in the ongoing decision making during a professional or amateur sports game.

The IPIE creates a new balance in the economics of the rewards for the fan. Upon the sale of a team in a relatively new league, for instance, women's basketball, the IPIE involved fan who became a shareholder of a team in that league is able to cash in on what that fan has helped create through the use of the IPIE in managing and owning the team. This system functions as the catalyst which sets free large populations of individuals with their newfound financing capabilities combined with more efficient consumer feedback. This causes sports businesses that use the IPIE to be run in a more professional manner as the fans have a more direct and immediate impact on the performance and overall professionalism of the contestants/employees. This combination can also enable a new league to blossom and thrive.

2. Corporate Management

Figure 7:
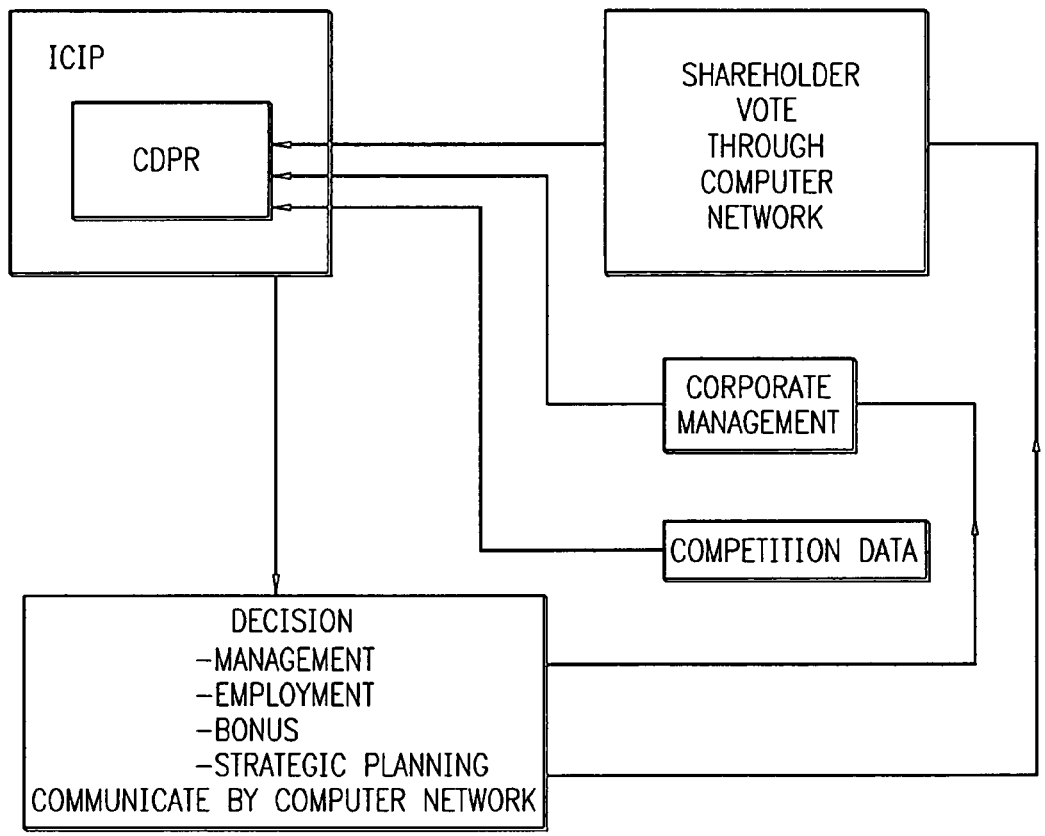
FIG. 7 shows a CDPR with an ICIP with a corporate management system.

This system, method and apparatus of the invention also operates with a similar program to run other types of companies, for instance an Internet Corporate Interactive Program (ICIP). The illustration of FIGS. 5a, 5b, 6a, 6b and 6c would be appropriate for corporate management in a similar sense. FIG. 7 provides an overall concept of corporate management.

Specifically, any company's shareholder or management decisions are performed with the use of the internet, the invented apparatus, system and method, by a vote through the use of the ICIP. This can be effected in real or near real time as needed. This combination of the computer network, for instance, the internet, the intranet or an extranet and the ICIP gives the investor an ability to participate in the company for investment. This encourages further investment which would benefit the company. Data in the form of statistics and other information can be made available through the ICIP interacting data files. This allows shareholders to perform many tasks: closely monitor the profitability of different departments of a publicly traded company; read data on the hours worked of each employee, years of service at the company, resume, and other information relative to the value of the employee.

Shareholders can monitor certain employees through audio/video cameras available for display on the shareholders' computer through the ICIP if the shareholder chooses to view that data. The shareholders can vote to have the company provide a new set or type of data for their perusal on the ICIP. This and other available data can be made available through the ICIP to allow shareholders to vote on bonuses to be given to employees from a pool of funds allocated by shareholders for that purpose.

Additionally shareholders can vote through the use of the ICIP to offer to sell a subsidiary if a certain minimum price is attained. This can be according to shareholder rules specifically and previously approved by vote. The ICIP provides data including the written opinions of the relevant division heads of the company as well as the opinions of market experts useful in making all such decisions. Different market expert's opinions may be purchased by the shareholders by through the use of ICIP voting to purchase that opinion on that issue. This provides the shareholder with a significant new way to feel a part of the company and would encourage people to become better informed as shareholders in monitoring their investments more closely and more accurately.

According to precise rules of the company and implemented by the ICIP, a certain minimum plurality of vote by the shareholders could then cause certain issues to be voted at the following stockholders annual meeting. The shareholders use the ICIP at the shareholders annual meeting to review pertinent data and vote the issues.

EXAMPLE

Preface

In more ancient times, the ritual of sport was very different than what we are used to today. The fans would decide the outcomes of games with their verbal responses or rather than just the team owners and the contestants. It was the involvement of the fans that made the sport exhilarating for everyone involved.

Today, the owners and players fight over money and benefits while the action of game suffers through these disputes. Fans are powerless, left to sit and watch as owners get greedy and players "hold-out" for more money. Then, as the ultimate slap-in-the-face, owners demand that the fans, with their public money, reward the owners with new stadiums and sports arenas. The fun and excitement of sport dwindles into the abyss of business reality. The fan is merely a spectator and is often an uninvolved and disgruntled customer as the political and economic games are played beyond their purview.

The invented system described here, along with its method and apparatus re-institutes the fan as part of the game itself. The system creates a triad relationship between the owners, the players and the fans.

With this invention the fans are able to influence the process of the sporting game and then become an involved and satisfied customer. The current sporting business system misses the advantages provided by this invention and neglects the fan.

With this invented system, fans are able to "micro-manage" a team in a professional league through a "management console." This console allows salary and bonus compensation manipulations of the team's activities by the fans themselves. The team is beholden to the fans as the data compiled by the fans input is averaged. These averages dictate a fan consensus of what the players are actually going to be paid.

Exemplary Scenario 1

Via this invention and the Internet and/or computer network, fans access the sports database. Each participating fan submits $1 per game to a reward fund dedicated for a particular game. Fans manage the team's overall game budget through the software Management Console. The game's most valuable player(s) is a mean obtained by calculating statistical salary and bonus conclusions, through fan votes of reward for merit of players. Individual achievement rewards are also awarded. In any case, the players get paid based on fan appreciation of actual ongoing play. This reward serves as an incentive for players to always play at an optimum level. This mutually beneficial incentive program provides excitement for the fans as well as another incentive for the players.

A Program

The Internet or workstation based software system that drives the operation consists of relational database tables and the graphical software management console.

The relational/linked database:
1. Player Data→Player ID.
Team Data→Team ID.
League Data→League ID.
2a. Player to Team=Player_ID; Team_ID
2b. Team to League=Team_ID; League_ID
3. Players Inherit←Team attributes|Teams Inherit←League Attributes Tables are utilized to distribute data in substantially identical format or related format as software classes. Different relational databases and algorithms are used to establish probabilities and outcomes and consequences. These can be based on statistical data models and techniques in relations to the player, players, and competitors. Controls are built-in to prevent sabotaging of the system by non-genuine participation. Input to participants can be received via different communication media including television, radio, telephone, email, regular mail, fax or the like. Voting or participation from the outside participant or remote user is via a communication network, preferably including the Internet.

As new members or remote users join, they can create a personal profile that is used to track management habits. The member has some control over a quasi-management decisions as to how team salaries and bonuses are spent. Members can choose leagues and teams to manage. The members input can be averaged to create a consensus that is used to compensate the players. Results of the consensus are stored and then utilized for rewards.

The management console provides a system and method of sports and team management. Utilizing computer systems, a team's decision making is managed from the desktop.

Although the description has focused to a large extent on sports operations, it is clear that many other systems are operable with the invention to facilitate greater responsiveness and control between customers and/or consumers and/or shareholders on one side and the actual operators, employees, performers, directors and managers on the other side. Many corporate operational actions and activities can be the subject of the present invention.

Many other possibilities of uses of the invention exist, each differing from others in matters of detail only. For instance, in sports action it is possible to provide direct signaling devices and/or sensors on the body or in the clothes or gear of a player. These sensors can have transceiver capabilities. Success, for instance, by a boxer, actually landing punches on an opponent can be signaled to the IPIE, and in turn to users of the IPIE. This permits once again for real time or almost real time, interaction between the player and the fans, who can react in almost real time to the events in the arena.

Figure 8:
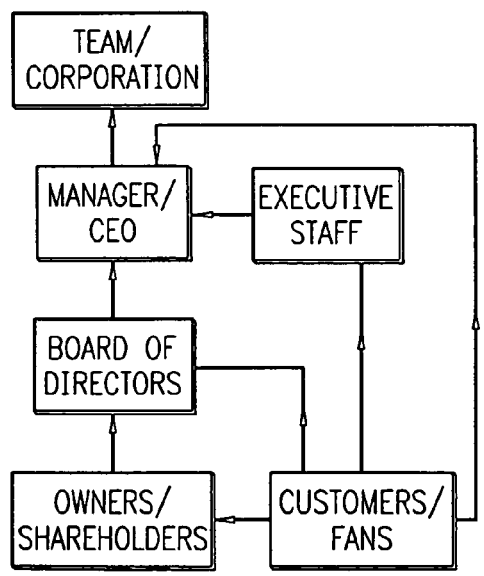
FIG. 8 is a representation of a hierarchical structure for a corporation or sports enterprise.

In FIG. 8 there is discloses a hierarchical situation for a sports team company between the different elements that form part of the hierarchical. At one level there is the team or corporation, the next level is the manager. The manager would be responsible to an executive staff, which in turn would be responsible to a board of directors, which in turn is responsible to the owners or shareholders. A different level of the hierarchy are the customers or fans, and through the system of the invention, these customers and fans can give input to any one or more of the board of directors, executive staff or manager in a real time or near real time environment. Because the system opens the management of a sports enterprise or corporation to customers or fans in a more direct way than is normally possible, appropriate screening, encryption and values are placed in position to ensure that voting an input from customers, shareholders or fans is properly evaluated including possible weighted analysis of votes depending on shareholder approved ascertainable operational evaluations of fan participation and loyalty such as: fan time investment in watching the games on television or live and/or with the use of the IPIE, fan monetary investment in the team through ownership of shares or season tickets. For instance, there can be a situation where a customer is intent on directly or indirectly sabotaging a corporation or sports team. Techniques are provided to ensure that that input is effectively screened. In a sports environment a fan, who, for instance, has been a long term season ticket holder can be given more weight in a decision than a more recent fan. Likewise, in a corporation structure, customers can be evaluated in the same way. In other words, customers which may be long term, high value clients and who have in the past spent considerable monies with the corporation can be given greater weight than smaller time, off the street type of customers.

In a further sense of the device as used in a sports team environment, one or more sensors can be used who are participants in a sports team. For instance, in a boxing environment, a sensor can be provided on the body and/or hand and/or article of clothing or glove of a boxer so that different data can be obtained. For instance, when a punch is actually landed as opposed to glancing off an opponent, this as well as the strength of impact would be effectively measured. This would allow the fans at any location, through the use of this invention, to have a better feel of whether or not a boxing match's outcome was predetermined or fixed while they obtain a more accurate presentation of the weight of each punch. For boxing matches or ice skating competition that end up requiring a decision by the judges as to the victor, this invention as described above can be a valuable tool in assisting in such a judgement. Similarly, in other contact sports, different sensors can be provided on the sports players. A suitable receiver/transmitter is built into the sensors to relay the information to the IPIE module directly or indirectly through a manager or the like.

In a different situation, an IPIE can be used for instance, in professional drafts of college players. At a time for drafting one or more players to a team, customers and fans may be able to give more direct input to the IPIE with regard to particular players to be drafted. The system can be used for sports teams or sports individuals alone.

In some cases, the near real time can be extended to be about one hour. The concept of the near real time is to obtain as prompt a response as possible. Also, although the telecommunication input is indicated to be a television source which is different to the computer terminal for responding, the situation can be contained in a single monitor device, for instance the Web TV (Trademark) system.

The system operates, for events other than sport or corporate activity, for instance, for other live events or performances such as live theater performances and/or concerts. The remote participant can respond to that live event. In certain situations, rehearsals of the event can be broadcast in an open circuit or closed circuit sense to remote participants who then respond in the real time or near real time frame.

As used in this application, the term "event" includes a sports event, sports competition, sports contest, live theater or concert event, or a corporate or business happening. An "actor", "player", or "participant" means any one or more persons involved in the core or central happening of the event.

Different exemplary applications of the invention are further discussed:

Example 1

Figure 9:
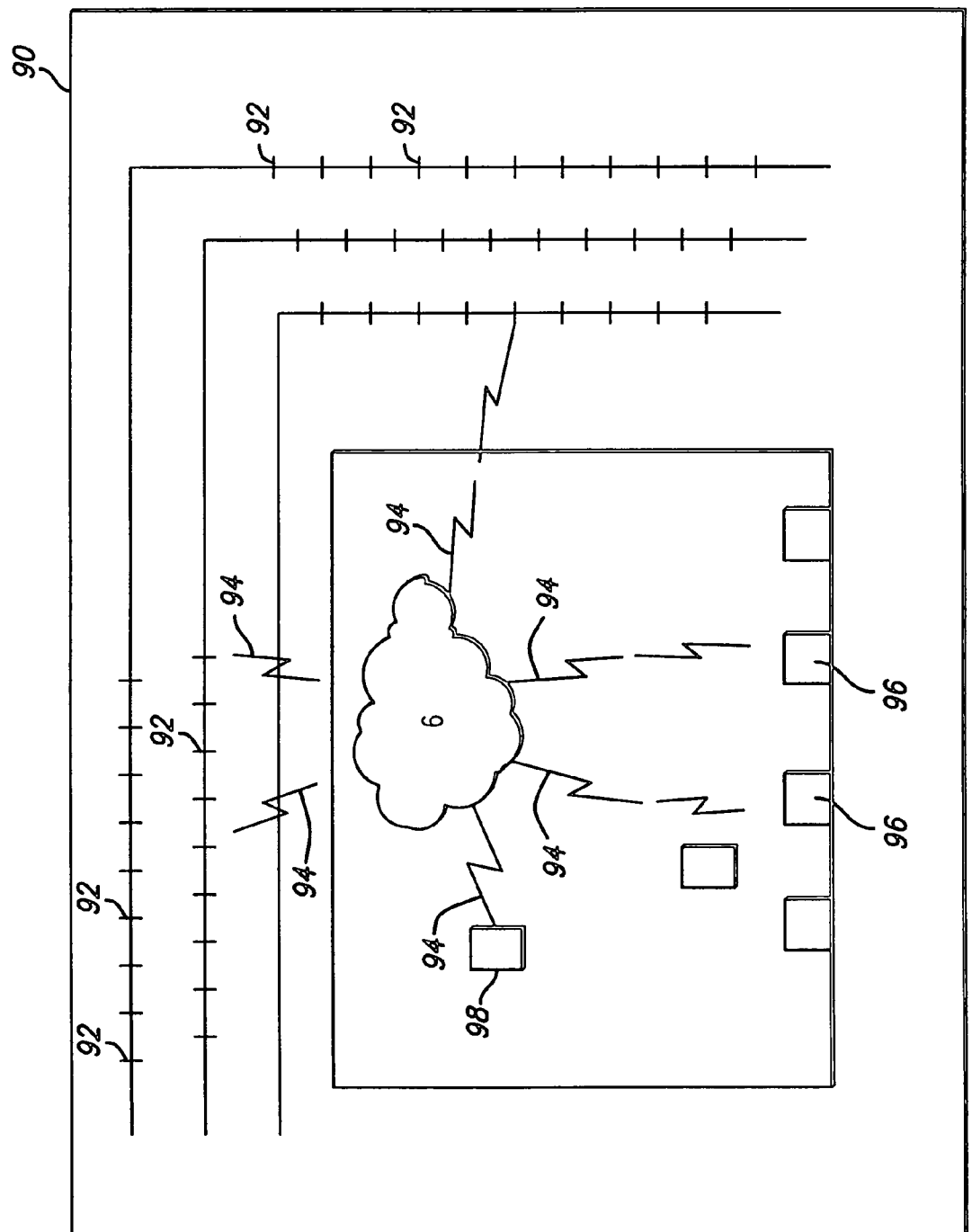
FIG. 9 is a representation of a stadium, such as a sports stadium, which is wired so that communication can take place between persons in the stadium or arena with events taking place on a central stage or field.

As shown in FIG. 9, sports stadiums, complexes, arenas or theaters 90 are hard-wired for Internet or other network (LAN) capability for use with SFR live, real time, interactive, etc. With respect to a virtual private network, each seat 92 has a computer, or access to a computer voting apparatus, monitor and keyboard for interacting in chat rooms or on more complicated sports management system interaction decision making or voting or information gathering systems through the use of the invention. The access can include power supplies and/or modems or other communication links. The communicator 94 is through the Internet 6. It can be to managers 96 and/or players 98. The managers 96 and/or players 98 has an appropriate receiver associated with them. There can be access to statistics on past performance of players or teams. Internet connections at each seat includes a telephone, cable modem, DSL, T1, etc.

Example 2

Wireless access to the invention via Internet access at sports stadiums at individual seats or at other types of mass entertainment complexes for use with the sports management system live, real time, interactive, etc. allows portability and thus ease of use is facilitated in interacting with the entertainment enterprise during the live, real time event.

Example 3

This example is the same as #1 & #2 above except it pertains to other mass entertainment facilities. At concert facilities, fans at the stadium vote during the concert to choose the next song for the band to play. At movie theaters, the movie-goer chooses between different endings to a movie or chooses different "takes" that were filmed of the same scene.

At a playhouse the audience members vote during casting calls on which actor should be hired for a certain role in a play to be produced.

Example 4

A wireless remote gadget allows the fan at any of the above types of performances to vote from any location inside or outside the facility. Each wireless device has a unique security identification number to identify the data sent as being sent from a specific authorized user/fan so that each fan that has properly purchased the right to participate has only one vote. The wireless device has many different designs for more complexity or less complexity. One of the less complex designs allows the fan to have only two choices. This two-choice device is ideal for allowing dozens of consecutive votes during a performance. The fan has perhaps two minutes to vote on who will be the starting quarterback. The fan is alerted to the quarterback selection vote by the videotron hanging in the stadium, or the question is e-mailed to the fans and appears on monitors at each seat or monitors that are a part of the Wireless remote gadget.

Example 5

In another variation, the fan is given two minutes to vote on the issue of whether their team should kick or receive the opening kick off if they win the coin toss. Subsequently, the fan is given two minutes to vote on who should make all the play calls for the first quarter of play between two experts choosing from the coaches selection of favorite plays. The wireless device for two choices are thus very small and inexpensive to make.

Example 6

This is similar to Example 4 above, but here the wireless device has more than two buttons for more than two choices.

These applications apply to the types of entertainment performances other than those listed above. The fans also vote during the writing and editing process of books, plays, movies, poems, musicals, etc.

Example 7

In sports, the general concept is that the decisions of the owner, coach, manager are made through the sports management system by the fan. Similarly, there are parallel concepts for other mass entertainment enterprises at every decision making point in the creative and production process.

With respect to movies, decisions regarding the investor/movie production company/producer, director, writer, set designer, photographer, casting director, etc. throughout the creative and production process are made by the movie-goer/fan. The same issues apply to plays. For music albums, decisions typically made by the recording label, musician, songwriter, lyricist, are reviewed and voted on by the fans throughout the entire creative and production process.

For novels or books of poems or short stories, decisions typically made by the publishing house, writer, and editor are voted on by the readers/fans via the system throughout the entire creative and production process. For symphonies, operas and musicals, the decisions typically made by the composer, conductor, investor/owner, director, etc., are made audience members/fans voting throughout the entire creative and production process.

Example 8

For all types of mass entertainment, the fan is given the opportunity to make a financial investment throughout the entire creative and production process of an entertainment project. The advantages are: a very high level of knowledge of the details regarding timeliness of progress; intimate information on the quality of the project; intimate access to the content of the project which allows fans to formulate their own projections as to profitability; and availability of independent expert opinions for use of the fan in voting on specific modifications to the project and affords the fan a better knowledge base for making an investment decision.

Financing is both won and lost throughout the entire creative and production process. This creates a viable possibility that many artistic and athletic projects that have never had an opportunity to receive funding that is actually produced.

An athletic or artistic project (Project) thus has some of the abilities to attain financing similar to a corporation. The Project effectively sells stock via the numbered system. A stock holder has a market that is created and managed by and through the numbered system. The creator has the potential of raising capital through the invention. When the project catches the attention of investors, the stock value goes up which allows the creator to sell additional stock at a higher price than the original price. If the investment is kept below the SEC limitations on the number of investors or if the SEC rules are followed by the creator, the number of total investors allowed is effected. The creator receives feedback not only from fan votes but also on investors interest or disinterest in investing and the concomitant value of the stock.

Example 9

Poetry authors submit their best poems on a certain subject like "love" to be voted on for inclusion into a book of poems from various authors through the use of the invented system. Through the use of the system, many books of poetry on many different subjects are with the best poems from various authors/poets. The annual best of all the different whole poetry books created are decided on by a vote.

This best poetry book is marketed with an advertising budget from the investors who were afforded the opportunity of investing in the project. The best book of poems are sold and downloaded to purchasers who also have proprietary software to enable the purchaser to obtain one copy of the poetry book the customer purchased. The software does not enable the purchaser to send an e-mail copy of the poetry book to anyone else. The proprietary software also does not enable printing.

Prospective customers view a list of books available for purchase that were voted by a certain number of votes as the year's best. Every five years the best individual "love" poems are voted on from any poem that had been selected to be put in any individual best of an individual year's poems. In that way there is a new book—best "love" poems for the five year period. Monetary prizes or royalties are paid to the author of each individual poem as it appears in each individual copy of a book that is sold. Successful books are printed in hardback versions and sold through normal distribution chains.

The investors who paid for advertising have a share of the profits as well as the many authors/poets. The percentage of profits paid to the investors is decided by vote at the time that the each round of financing is raised by the authors and any previous investors. A group of owners of a book of poems vote in favor of offering for sale for a two month period shares of ownership in the venture that owns this book of "love" poems. The investment prospectus includes the requisite SEC filings as needed and facilitated. The investment prospectus includes a detailed budget delineating the ways that the money raised is spent to promote sales of the poetry book.

The budget in the prospectus is voted on for approval by the then current owners of the poetry book. Owners have a security personal identification number allowing them to vote on owner decisions. The general public has opportunities to vote on issues that are not ownership issues. The public suggests and votes on suggested changes to a poem to improve the poem. If the original poet/author disagrees with the changes, then with enough votes of the then current ownership group the poem could still be changed to the majority voted new version, assuming the original rules of the owners of the poem had included the original poet's transferring his copyright to the ownership group.

In this way, the poem can have an ever-changing life of its own over time. Potentially, different versions of the same poem might be more or less attractive in various cultures or various parts of a country depending on the market influences of a particular region. As a result, the ownership group votes to market different versions of the generally same book of poems in different regions of the world.

Different versions of "love" poems, different cover designs, different marketing colors and different logos are voted on by the public to determine the best marketing of that book of "love" poems for different age groups and different sex purchasers. A purchaser who asks for the "best book of love poems" that is targeted for a seventy-five year old woman in Alaska may well be significantly different from the "best book of love poems" marketed for a teenage woman from Hawaii.

Many and diverse cultures of the world would have an opportunity for their artistic expression to thrive in the marketplace and give the entire world the opportunity to appreciate each one. The same process could be applied to music, novels, movies, plays, musicals, etc.

Example 10

As illustrated in FIG. 9, there is also a connection with a participant, player or performer on the stage, field or arena. This is a wireless connection with that participant. A spectator can thereby communicate directly with such an individual or group of individuals. This communication is essentially a wireless communication. An appropriate receiver is carried by the actor, participant or player. In situations where contact sports are involved, this sensor and/or receiver is appropriately shock-absorbable, for instance, can be located in a helmet of a player.

The invention is to be determined solely by the following claims.

What is claimed is:

1. A method of sports management by a remote party of an entity owning at least one sports player and having a database for the sports management comprising:

relating a current database of a player together with a historical database related to that player;

communicating the data between a central database processing resource and at least one remote party;

receiving an access request message from the remote party via a communications link;

transmitting an access enabling message to the remote party via the communications link wherein the remote party is authorized to access the database, the access enabling message permitting the remote party to access the database and access designated data from the database, the data in the database including historical data relating to the player with the current data related to that player being accessed;

compiling a report from the accessed database, the report including the current data of a player together with the historical data related to that player; and transmitting the compiled report of the data of the player to the remote party;

the computer providing the remote user with the ability in real time or near real time to submit a decision to a central database, the decision being used to effect the status of said at least one sports player.

2. The method of claim 1, comprising the steps of verifying that the access to the database is authorized.

3. The method of claim 1, including periodically updating the database with at least one of the historical or current data about the player.

4. The method of claim 1, including analyzing the data of the player, and providing the report to the remote party based on the analysis of the data of the player.

5. The method of claim 1, comprising the step of storing the report in the central database processing resource.

6. The method of claim 1, including controlling access to the central database processing resource, and wherein data in the database is accessible to selected multiple remote parties.

7. The method of claim 6, including the step of verifying that selected remote parties are authorized to access the database or selected data in the database.

8. The method of claim 1, including combining historical data of players with current data of players thereby to permit an analysis predicting play scenarios and probabilities of selected players.

9. The method of claim 1, including sending an access request message from the remote parties via a communications link, and the communications link is selectively a computer network, preferably including the Internet.

10. The method of claim 1, including receiving data of a subject player, storing, retrieving, comparing, analyzing the data thereby to obtain assessment data.

11. The method of claim 1, including encrypting the data.

12. The method of claim 1, including the steps of communicating between a remote party and the central database processing resource through a computer network, providing credit card information of the remote user prior to providing the data and transferring such data to the remote user after charging a credit card for such data.

13. The method of claim 1, including transferring money electronically via a telecommunications line between respective financial entities related to the remote party and to an operator of the central database, and, after transfer of money electronically, providing data from the central database to the remote party.

14. The method of claim 1, including the step of the remote party transmitting a decision from a remote terminal to the database through a computer network, the decision being at least one relating to the status of a player, financial reward to a player, financial reward to a team related to the player, or financial reward in relation to a sports competition with regard to a sports team.

15. The method of claim 1 wherein the communication to the remote user is through a communication link, and wherein the remote party sends a response to the database, the response being through a computer network, and being in substantially real or near real time in relation to the communication received by the remote user.

16. The method of claim 15 wherein the remote party receives information about a sports event through television and responds through the computer network to the database, and the database transmits a message to the player or a team manager related to the player.

17. The method of claim 1 wherein the remote party receives at least one expert opinion, and wherein the remote transmits a response in relation at least in response to the expert opinion.

18. The method of claim 1 wherein a controller of a central database receives at least one expert opinion on an issue, and wherein the expert opinion is selectively made available to a remote user, such that the remote user can selectively make decisions based on the opinion, and selectively transmit the decision to the central database.

19. The method as claimed in claim 1 wherein there is a hierarchy of remote users, different levels in the hierarchy having different weight for their respective decision, which decisions can be transmitted to the central database.

20. The method of claim 19 wherein some of the remote users in the hierarchy are non-shareholders in relationship to ownership of the database for managing a sports entity, others if the hierarchy are shareholders, and others are board members for the entity owning the database.

21. Apparatus for sports management by a remote party of an entity owning at least one sports player and having a database for the sports management comprising:
a program to relate historical data of a player together with current assessment data related to that player;
a computer communication network for data communication being between a central database processing resource reactive with the program and at least one remote party;
means for receiving an access request message from a remote party via the communications link;
means for transmitting an access enabling message to the remote party via the communications link wherein the remote party is authorized to access the database, the access enabling message permitting the remote party to access the database and access designated data from the database, the data in the database including current data relating to the player and historical data related to the player being accessed;
means for compiling a report from the accessed database, the report including the current and historical data; and
the communication network being for transmitting the compiled report of the assessment data of the player to the remote party;
the computer communications network providing the remote party with the ability in real time or near real time to submit a decision to a central database, the decision being used to effect the status of said at least one sports player;
wherein said means for receiving an access request, said means for transmitting an access enabling message, and said means for compiling a report comprise one or more particular machines, said one or more particular machines comprising one or more physical computing devices.

22. The apparatus of claim 21, comprising means for verifying that the access to the database is authorized.

23. The apparatus of claim 22, including means for receiving in a database of the central database processing resource, data relating to the current assessment of a selected player and receiving in the database of the central database processing resource, and historical data relating to the player, other players, and the current and historical background of related players.

24. The apparatus of claim 22, including means for permitting a remote party of the database to pay for a communication with the central database through a computer network, and including a computer communication network for submitting data to a remote user after receipt of the payment.

25. The apparatus of claim 21, including means for analyzing the current assessment data of a player and the historical data related to the player, and means for providing the report to the remote party based on the analysis the assessment data of the player and the historical data.

26. The apparatus of claim 21, comprising means for storing the report in the central database processing resource.

27. The apparatus of claim 21, including means for controlling access to the central database processing resource to selected multiple remote parties.

28. The apparatus of claim 21, including means for combining data of players, and means to permit an analysis predicting probabilities of play of selected players.

29. The apparatus of claim 21, including means of communicating between a remote party and the central database processing resource through a computer network, means for providing credit card information of the remote party prior to providing assessment data and/or historical data and transferring such data to the remote party after charging a credit card for such data.

30. The apparatus of claim 21, including the means for remote party transmitting a decision from a remote terminal to the database through a computer network, the decision being at least one relating to the status of a player, financial reward to a player, financial reward to a team related to the player, or financial reward in relation to a sports competition with regard to a sports team.

31. The apparatus of claim 21 wherein the communication to the remote user is through a communication link, and wherein the remote party computer network, and being in substantially real or near real time in relation to the communication received by the remote user.

32. The apparatus of claim 21 wherein the remote party receives information about a sports event through television and the remote party responds through the computer network to the database, and the database transmits a message to the player or a team manager related to the player.

33. Apparatus for sports management by a remote party comprising:
  a screen used by a remote party for monitoring, using a computer, both current data for a player, and historical data about the player, the data being retained on a central database;
  the computer being for analyzing the current data and the historical data related to the player based on predetermined characteristics;
  a communications network between a central database processing resource and the remote party for communicating the analysis of the combined data with the remote party; and
  the computer providing the remote user with the ability in real time or near real time to submit a decision to a central database, the decision being used to effect the status of said player.

34. The apparatus of claim 33, including means for the remote party to transmit a decision from a remote terminal to the database through a computer network, the decision being at least one relating to the status of a player, financial reward to a player, financial reward to a team related to the player, or financial reward in relation to a sports competition with regard to a sports team.

35. The apparatus of claim 33 wherein the communication to the remote user is through a communication link, and wherein the remote party computer network, and being in substantially real or near real time in relation to the communication received by the remote user.

36. The apparatus of claim 35 wherein the remote party receives information about a sports event through television and responds through the computer network to the database, and the database transmits a message to the player or a team manager related to the player.

37. A system for managing sport comprising:
  a computer based communications network,
  a computer at a central database processing resource provider to receive through the network, current data for a player, the current data, and historical data about the player;
  a screen for monitoring, using a computer, both the current data of the player, and the historical data about the player, the screen being used by a remote user;
  a particular machine, said particular machine comprising a physical processor for analyzing the current data and the historical data based on predetermined characteristics;
  a computer for receiving, through the network, the analysis; and
  the remote user being capable in substantially real time or near real time after receiving the analysis to respond to the analysis and submit a decision to a central database, the decision being used to effect the status of said player.

38. The system of claim 37, including receiving in a database of a central database processing resource, data relating to a selected player and receiving in the database of the central data processing resource, historical data relating to the background about the player, and wherein the remote user selectively receives the data from a sport enterprise, event or player in real time or near real time from a television or video monitor.

39. The system of claim 37, including permitting a remote party of the network to pay for the analysis of the assessment and data through the computer network, and including permitting the computer communications network to communicate between the remote user and the central database after receipt of the payment.

40. The method as claimed in claim 37 wherein there is a hierarchy of remote users, different levels in the hierarchy having different weight for their respective decision, which decisions can be transmitted to the central database.

41. The method of claim 37 wherein, the remote party receives at least one expert opinion, and wherein the remote transmits a response m relation at least m response to the expert opinion.

42. The method of claim 37 wherein a controller of a central database receives at least one expert opinion on an issue, and wherein the expert opinion is selectively made available to a remote user, such that the remote user can selectively make decisions based on the opinion, and selectively transmit the decision to the central database.

43. A method of live event management by a remote party, the live event being transmitted to a remote party by a communications link, the live event being organized by an entity having a database for the management comprising:
  providing a central database processing resource of the event;
  communicating data between the central database processing resource and at least one remote party;
  receiving an access request message from the remote party via a communications link;
  transmitting an access enabling message to the remote party via the communications link wherein the remote party is authorized to access the database, the access enabling message permitting the remote party to access the database and access designated data from the database;
  transmitting data of the event to the remote party, and
  wherein the communication to the remote party is through a communication link, and wherein the remote party sends a response to the database, the response effecting the live event, the response being through a computer network, and being in substantially real or near real time in relation to the communication received by the remote user from the communications link;
  wherein said steps of communicating data, receiving an access request, transmitting an access enabling message, and transmitting data are performed on one or more particular machines, said one or more particular machines comprising one or more physical computing device.

44. The method of claim 43 wherein the remote party receives information about a live event on a communication system including television and responds through the com-

23 puter network to the database, and the database transmits a message to a manager related to the event.

45. A method of sports management by a remote party of an entity owning at least one sports player and having a database for the sports management comprising:
relating a current database of a player together with a historical database related to that player;
communicating the data between a central database processing resource and at least one remote party;
receiving an access request message from the remote party via a communications link;
transmitting an access enabling message to the remote party via the communications link wherein the remote party is authorized to access the database, the access enabling message permitting the remote party to access the database and access designated data from the database, the data in the database including historical data relating to the player with the current data related to that player being accessed;
compiling a report from the accessed database, the report including the current data of a player together with the historical data related to that player;
transmitting the compiled report of the data of the player to the remote party; and
using a communications network between the central database processing resource and the remote party for locating the remote party in a seat associated with a live sports event such that the remote party views an actual live sports event associated with the database;
wherein said steps of receiving an access request message, transmitting an access enabling message to the remote party, compiling a report from the accessed database, and transmitting the compiled report are performed on at least one particular machine, said at least one particular machine comprising at least one physical computer.

46. The method of claim 45, including sending an access request message from the remote parties via a communications link, and the communications link is selectively a computer network, preferably including the Internet.

47. The method of claim 46 wherein the remote party receives information about a sports event through television and responds through the computer network to the database, and the database transmits a message to the player or a team manager related to the player.

48. Apparatus for sports management by a remote party of an entity owning at least one sports player and having a database for the sports management comprising:
a program to relate historical data of a player together with current assessment data related to that player;
a computer communication network for data communication being between a central database processing resource reactive with the program and at least one remote party;
means for receiving an access request message from a remote party via the communications link;
means for transmitting an access enabling message to the remote party via the communications link wherein the remote party is authorized to access the database, the access enabling message permitting the remote party to access the database and access designated data from the database, the data in the database including current data relating to the player and historical data related to the player being accessed;
means for compiling a report from the accessed database, the report including the current and historical data;
the communication network being for transmitting the compiled report of the assessment data of the player to the remote party; and
the remote party being located in a spectator seat to be present to view an actual sports event related to the data;
wherein said means for receiving an access request, means for transmitting an access enabling message, and means for compiling a report comprise at least one particular machine, said at least one particular machine comprising at least one physical computer.

49. Apparatus as claimed in claim 48 wherein the seat is wired for communication through the Internet or other network to the databases.

50. Apparatus as claimed in claim 48 including means to permit the remote party to communicate directly or indirectly with the sports player.

51. A method of live event management by a remote party, the live event being transmitted to a remote party by a communications link, the live event being organized by an entity owning having a database for the management comprising:
providing a central database processing resource of the event;
communicating data between the central database processing resource and at least one remote party;
receiving an access request message from the remote party via a communications link;
transmitting an access enabling message to the remote party via the communications link wherein the remote party is authorized to access the database, the access enabling message permitting the remote party to access the database and access designated data from the database;
transmitting data of the event to the remote party;
wherein the communication to the remote party is through a communication link, and wherein the remote party sends a response to the database, the response being through a computer network, and being in substantially real or near real time in relation to the communication received by the remote user from the communications link; and
using a communications network between the central database processing resource and the remote party for locating the remote party in a seat associated with a live event such that the remote party views an actual live event associated with the database;
wherein said steps of communicating data, receiving an access request message, transmitting an access enabling message, and transmitting data are performed on at least one particular machine, said at least one particular machine comprising at least one physical computer.

52. A method of substantially real time participation by a remote party in the conduct of an entertainment event, the entertainment event having a manager, a plurality of participants, and a database containing data relating to the entertainment event and the performers or participants, the method comprising the steps of:
the remote party viewing data for a performer or participant in the entertainment event;
the remote party analyzing the data related to the performer or participant based on one or more characteristics;
transmitting data regarding a decision or event in connection with the entertainment event to the remote party;
the remote party transmitting a decision from a remote terminal via a communications link to the database, the decision being at least one relating to a status of the performer or participant in the entertainment event, a financial reward to the performer or participant, a penalty to the performer or participant, or a choice of one of a plurality of responses to a query from the manager of the entertainment event;

using a particular machine to receive said decision transmitted from said remote terminal and to affect the entertainment event in accordance with the decision, said particular machine comprising at least one physical computing device.

53. The method of claim 52 wherein the remote party transmits the decision to the database via a telephone network, the decision being in substantially real or near real time in relation to the data regarding the decision received by the remote party.

54. The method of claim 52 wherein the remote party transmits the decision to the database via a wireless communications network, the decision being in substantially real or near real time in relation to the data regarding the decision received by the remote party.

55. The method of claim 54 wherein the remote party transmits the decision to the database via messaging over the wireless network.

56. The method of claim 54 wherein the remote party transmits the decision to the database via a pager over the wireless communications network.

57. The method of claim 54 wherein the remote party transmits the decision to the database via an email communication sent via a personal digital assistant over the wireless communications network.

58. The method of claim 52 wherein the remote party transmits the decision to the database via a computer network, the decision being in substantially real or near real time in relation to the data regarding the decision received by the remote party.

59. The method of claim 58 wherein the remote party transmits the decision to the database via email transmitted via the computer network.

60. The method of claim 52 wherein the remote party viewing step is conducted using a television monitor/receiver.

61. The method of claim 52 wherein the remote party viewing step is conducted using a computer.

62. The method of claim 52 wherein the remote party viewing step is conducted using a combination of a television monitor/receiver and a computer.

63. The method of claim 52 wherein the remote party viewing step is conducted using a combination of a computer and a wireless communications device.

64. The method of claim 52 wherein the entertainment event is a television show.

65. The method of claim 52 wherein the entertainment event is a contest or a game.

66. The method of claim 52 wherein the entertainment event is a movie.

67. The method of claim 52 wherein the entertainment event is a concert.

68. The method of claim 52 wherein the entertainment event is a live theater production.

69. The method of claim 52 further comprising the step of the remote party transmitting from a remote terminal via a communications link to the database a request for purchase of merchandise relating to the entertainment event.

70. The method of claim 69 wherein the merchandise relating to the entertainment event is a data recording or an at-home game version of the entertainment event.

71. A method of substantially real time participation by a remote party in the judging of an artistic work, the artistic work having a creator, a manager and a database containing data relating to the artistic work and the creator, the method comprising the steps of:

the remote party viewing data for the creator via a display on a computing device;

the remote party analyzing data related to the creator based on one or more characteristics;

transmitting data regarding a decision or event in connection with the artistic work to the remote party; and permitting the remote party to respond via the communications link to the database, the remote party transmitting a decision from a remote terminal via a communications link to the database, the decision being at least one relating to a status of the creator, a financial reward to the creator, a penalty to the creator, or a choice of one of a plurality of responses to a query from the manager.

72. The method of claim 71 wherein the artistic work is one of a novel, a short story, a poem, a musical composition, a song, a painting or a sculpture.

73. A method of substantially real time participation by a remote party in the judging of an artistic work, the artistic work having a creator, a manager and a database containing data relating to the artistic work and the creator, the method comprising the steps of:

the remote party viewing data for the creator via a display on a computing device;

the remote party analyzing data related to the creator based on one or more characteristics;

using a computer to transmit data regarding a decision or event in connection with the artistic work to the remote party;

the remote party transmitting a decision from a remote terminal via a communications link to the database, the decision being at least one relating to a status of the creator, a financial reward to the creator, a penalty to the creator, or a choice of one of a plurality of responses to a query from the manager; and using the decision transmitted from the remote terminal to affect at least one of: said status of the creator, said financial reward to the creator, said penalty to the creator, or said choice of one of a plurality of responses to a query from the manager.

74. The method of claim 73, further comprising the steps of verifying that the remote party's access to the database is authorized, and permitting the remote party to respond to the query via the communications link to the database.

75. The method of claim 73 wherein the artistic work is one of a novel, a short story, a poem, a musical composition, a song, a painting or a sculpture.

\* \* \* \* \*